US012565069B2

(12) United States Patent
Arpaci

(10) Patent No.: US 12,565,069 B2
(45) Date of Patent: Mar. 3, 2026

(54) AXIS ADJUSTMENT SYSTEM, ECCENTRIC ELEMENT FOR SUCH A SYSTEM AND METHOD OF AXIS ADJUSTMENT

(71) Applicant: SAF-HOLLAND GmbH, Bessenbach (DE)

(72) Inventor: Muhammet Arpaci, Hösbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 236 days.

(21) Appl. No.: 17/754,786

(22) PCT Filed: Oct. 9, 2020

(86) PCT No.: PCT/EP2020/078409
§ 371 (c)(1),
(2) Date: Jul. 29, 2024

(87) PCT Pub. No.: WO2021/074030
PCT Pub. Date: Apr. 22, 2021

(65) Prior Publication Data
US 2024/0367471 A1 Nov. 7, 2024

(30) Foreign Application Priority Data

Oct. 16, 2019 (DE) ..................... 10 2019 127 946.1

(51) Int. Cl.
*B60G 7/00* (2006.01)
*B62D 17/00* (2006.01)
(52) U.S. Cl.
CPC ............. *B60G 7/006* (2013.01); *B62D 17/00* (2013.01); *B60G 2200/4622* (2013.01)

(58) Field of Classification Search
CPC ........ B60B 35/005; B62D 17/00; B60G 7/02; B60G 7/006
See application file for complete search history.

(56) References Cited

U.S. PATENT DOCUMENTS 4,267,896 A * 5/1981 Hendriksen ............ B60G 9/003
267/66
4,650,208 A * 3/1987 Mason ................... B62D 17/00
280/86.757
(Continued)

FOREIGN PATENT DOCUMENTS

CN 114132379 A * 3/2022
DE 4109108 A1 * 9/1992
(Continued)

OTHER PUBLICATIONS

European Patent Office; International Search Report; Dec. 10, 2020; entire document.

*Primary Examiner* — Nicole T Verley
(74) *Attorney, Agent, or Firm* — Price Heneveld LLP

(57) ABSTRACT

Axle adjustment system of a commercial vehicle includes a frame element with a first guide region that includes first guide openings where the first region is attached to an axle and displaces a steering element in an adjustment direction, and an alignable eccentric element with an opening, the arrangement of which relative to the first guide region determines the displacement of the steering element, and a second guide region that includes a second guide opening via which the eccentric element and the frame element are in engagement with one another and in which a pin-like element engages the pin-like element being movable in the second guide opening, when the eccentric element is aligned.

17 Claims, 8 Drawing Sheets

(56) References Cited

U.S. PATENT DOCUMENTS

| | | | | |
|---|---|---|---|---|
| 4,736,964 A * | 4/1988 | Specktor | ............... | B60G 7/02 |
| | | | | 280/86.753 |
| 4,869,527 A * | 9/1989 | Coddens | ............... | B60G 7/02 |
| | | | | 280/86.753 |
| 5,775,719 A * | 7/1998 | Holden | ............... | B62D 17/00 |
| | | | | 280/86.75 |
| 6,659,479 B1 * | 12/2003 | Raidel, II | ............... | B60G 7/02 |
| | | | | 280/124.16 |
| 7,125,026 B2 * | 10/2006 | Genick, II | ........... | F16B 35/041 |
| | | | | 280/86.753 |
| 7,296,809 B2 * | 11/2007 | Zebolsky | ............... | B60G 7/008 |
| | | | | 280/86.753 |
| 8,944,447 B2 * | 2/2015 | Khoury | ............... | B62D 17/00 |
| | | | | 301/128 |
| 9,315,222 B1 * | 4/2016 | Wetter | ............... | B60G 9/02 |
| 2004/0090030 A1 | 5/2004 | Genick, II | | |

| | | | | |
|---|---|---|---|---|
| 2005/0001397 A1 | 1/2005 | Genick, II | | |
| 2005/0146105 A1 | 7/2005 | Soles et al. | | |
| 2006/0055141 A1 | 3/2006 | Geusens | | |
| 2006/0181043 A1 * | 8/2006 | Zebolsky | ............... | B60G 9/003 |
| | | | | 280/86.754 |
| 2006/0181044 A1 * | 8/2006 | Zebolsky | ............... | B60G 9/003 |
| | | | | 280/86.75 |
| 2011/0068524 A1 | 3/2011 | McCarthy et al. | | |
| 2011/0233880 A1 * | 9/2011 | Lee | ............... | B60G 7/006 |
| | | | | 411/366.1 |
| 2019/0168558 A1 | 6/2019 | Dolan et al. | | |

FOREIGN PATENT DOCUMENTS

| | | | | | |
|---|---|---|---|---|---|
| DE | 102011084198 A1 | | 5/2017 | | |
| EP | 2736732 B1 | | 10/2012 | | |
| EP | 3530497 A1 * | 8/2019 | ............ | B21D 28/32 |
| GB | 2257670 A * | 1/1993 | ........... | B60G 11/465 |
| KR | 20080026309 A * | 3/2008 | | |

* cited by examiner

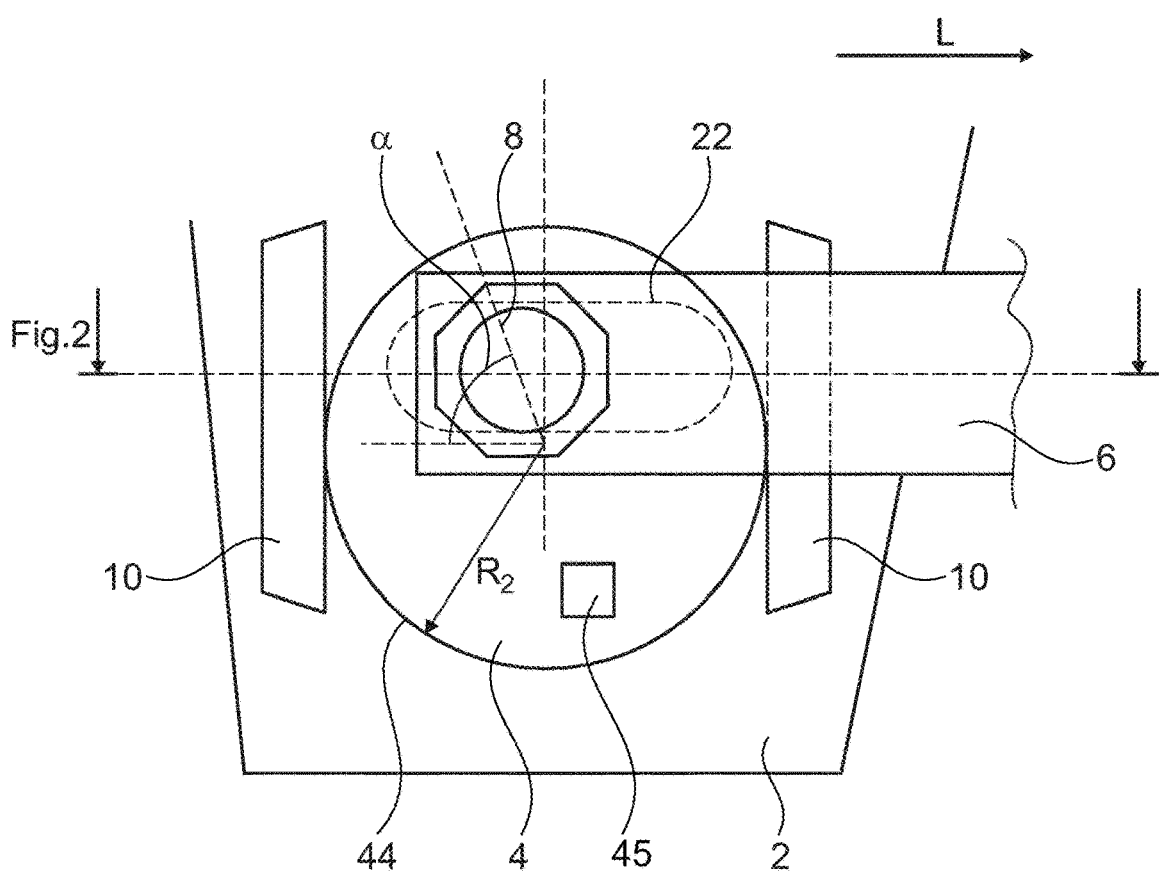
Fig. 1 - PRIOR ART
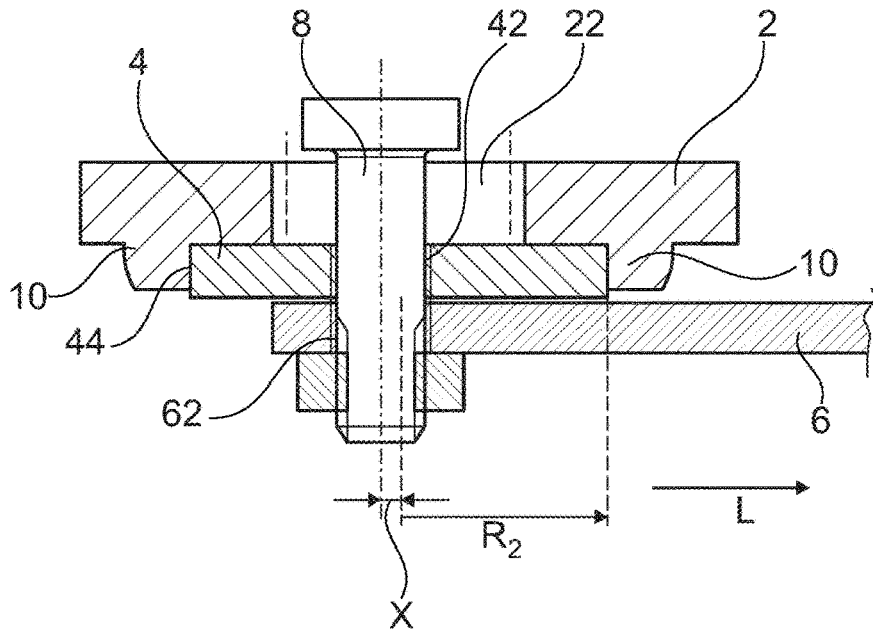
Fig. 2 - PRIOR ART

AXIS ADJUSTMENT SYSTEM, ECCENTRIC ELEMENT FOR SUCH A SYSTEM AND METHOD OF AXIS ADJUSTMENT

BACKGROUND OF THE INVENTION

The present invention relates to an axle adjustment system, an excentric element for such a system and a method for axle adjustment.

Axle adjustment of commercial vehicles is known from the prior art. In particular, the track of an axle or the track of the wheels fixed to the axle is adjusted or corrected by means of an axle adjustment. In prior art axle adjustments, in particular a spindle or a threaded rod is used, which is rotated relative to an engagement element and thus triggers a shortening or lengthening of the adjustment element, which in turn causes a displacement at one end of the axle along the longitudinal axis of the commercial vehicle. The problem is that the spindle is susceptible to dirt, corrosion or damage by parts whirled up during travel and that the adjustment of the spindle is complicated, in particular due to a large number of necessary assembly steps, and thus the operational safety of the commercial vehicle can only be ensured at great expense.

USA-2011/0068524 and EP 2 736 732 B1 disclose an axle adjustment for an axle of commercial vehicles with a frame element, an eccentric element and a steering element, wherein the eccentric element has a first contour or a first opening via which a steering element can be brought into engagement with the eccentric element and wherein the eccentric element has a second contour or an outer contour via which the frame element can be brought into engagement with the eccentric element. The first contour is arranged eccentrically with respect to the second contour and the eccentric element can be fixed force fitting to the frame element and the steering element by means of a first fastening means, and wherein, by setting a specific angle of rotation of the eccentric element, the frame element and the steering element can be secured in a predeterminable position along an adjustment direction and can be pivotably mounted with respect to one another.

It is an object of the present invention to provide a system which improves or simplifies the measures for enabling a convenient track adjustment or axle adjustment, in particular with regard to the constructive measures on the vehicle frame required for this purpose.

SUMMARY OF THE INVENTION

According to a first aspect of the present invention, an axle adjustment system, in particular of a commercial vehicle, is provided comprising a frame element with a first guide region, in particular in the form of a first guide opening, for displacing a steering element, to which the axle is connected in the mounted state, in the adjustment direction, an alignable eccentric element with an opening, the arrangement of which in relation to the first guide region determines the displacement of the steering element, and a second guide region, in particular in the form of a second guide opening, via which the eccentric element and the frame element are in engagement with one another and in which, in the mounted state, a pin-like element engages, the pin-like element, when the eccentric element is aligned relative to or along the second guide region, in particular in the second guide opening, cn be displaced or moved. According to the invention, it is provided that a pin-like element engages in a second guide region, in particular in order to secure the eccentric element against displacements in the direction of adjustment. Accordingly, the combination of the second guiding region and the pin-like element replaces the fastening lugs or lug elements known from the prior art to secure the eccentric element against displacement or shifting in the direction of adjustment. This is an advantageous way to save weight on the entire axle adjustment system. In addition, the design of the axle adjustment system is as economical as possible in terms of space, especially in comparison with the axle adjustment systems of the prior art. Finally, the use of a system according to the invention allows more design freedom in the design of a system for bearing axles, since the lateral limitation by the lug elements can be dispensed with. In particular, it is intended that the axle adjustment system is used for tracking, i.e. for aligning a steering element with respect to the direction of travel of a vehicle on which the steering element is mounted. For example, a steering element is one that carries the axle at one end, for example in a corresponding bearing, and is hinged at another end to the frame element, for example to a support bracket. In this case, the pivotable bearing of the steering element on the support bracket, in particular together with a pneumatic spring system, serves spring-bearing the axle. A support bracket advantageously has two side walls which are connected to each other via an end wall. The two side walls in particular have the or the first guide region. A bearing block in the sense of the invention is in particular a bearing block for a commercial vehicle and is therefore advantageously capable of supporting an axle load of 7 t, preferably of 10 t, and particularly preferably of 12 t. Advantageously, the bearing block has a mounting plane which serves to be connected to a frame of a vehicle, in particular by a material-locking joint. Advantageously, the mounting plane is formed by surfaces of the two side walls and/or the end wall. By means of the axle adjustment system, it is possible to set the steering element at an appropriate angle, in particular in relation to a direction determined by the direction of travel. It is conceivable that the pin-like element is formed on the frame element and/or on the eccentric element or that the second guide region is formed on the eccentric element and/or on the frame element. Accordingly, it is envisaged that the pin-like element and the second guide region engage with each other in the mounted state and, in particular, contribute to binding the eccentric element to the frame element. The pin-like element can be, for example, a cylindrical pin, a tapered pin, a tension pin and/or a bolt with or without a head and with or without a thread. Advantageously, the pin-like element is formed such that it extends in a longitudinal direction and has a diameter that is smaller than the maximum extension in the longitudinal direction. Preferably, the first guide opening is an elongated hole, preferably rectilinear, which is formed essentially parallel to the adjustment direction. It is also conceivable that the elongated hole runs at an angle to the adjustment direction, at least in sections. Furthermore, it is preferably provided that the first guide region formed as an elongated hole is formed on two opposite side walls of the frame element, in order to thereby enable a clear displacement or inclined position of the axis with the displacement along the first guide region. In particular, it is intended that the eccentric element is aligned during its alignment, i.e. in particular during its rotation for the displacement of the axle, in such a way that the opening of the eccentric element is arranged congruently above a certain partial section or partial region of the slot of the first guide region. By means of a fastening means passing through the opening and through the first guide region, it is then possible to fix the eccentric element and thus to fix the position of the axle, especially when the steering element itself is articulated. Particularly preferably, the position of the bearing element is coupled to the orientation of the eccentric element, for example in that the steering element has an opening that is permanently congruent with the opening in the eccentric element in the mounted state. Preferably, the system is intended for a commercial vehicle or a commercial vehicle trailer. A commercial vehicle trailer or commercial vehicle is in particular a vehicle or trailer which has a permissible total mass of at least 7.51 t, preferably at least 10.1 t and particularly preferably at least 15.1 t.

Furthermore, the pin-like element is preferably part of the frame element, whereby the pin-like element is particularly preferably arranged at the same level as the first guide region. In addition to the design of the first guide region and/or the second guide region in the form of an elongated hole, it is also conceivable alternatively that the first and/or the second guide region is designed in the form of a rail system, in which in each case a pin-like element engages in a corresponding rail-like recess or a corresponding device. However, the design as a continuous guide opening has proven to be particularly advantageous during manufacture and handling, especially because no jamming or the like is to be expected here.

According to a preferred embodiment, the second guide region runs in an circular arc or curved shape, preferably as an circular arc-shaped elongated hole. Particularly preferably, the second guide region, in particular formed as a second guide opening, runs with a constant radius of curvature and/or concentrically to the centre of the eccentric element. The arcuate course preferably extends over more than 45°, for example the arcuate second guide region extends over an angular range between 45° and 180°. Furthermore, it is preferably provided that a ratio of a radially measured distance between the circular arc-shaped second guide region and the outer contour on the one hand to the eccentricity, i.e. the distance between the first centre of the opening of the eccentric element and the second centre of the eccentric element, on the other hand, assumes a value between 0.5 and 0.9. Accordingly, the second guide region is located at the outermost edge of the eccentric element. Preferably, the elongated hole is free of contours or without a profile. Alternatively, it is conceivable that the elongated hole, in particular on its inner side which is in contact with the pin-like element, is profiled or has a contour in order to continuously define certain positions for the pin-like element. For example, it is conceivable that the inner side of the contour defining the second guide region or the second guide opening is wave-like in order to define preferred orientations of the pin-like element in the second guide opening in the respective valleys. In this way, discrete values for the axis adjustment can be defined.

Advantageously, the second guide region runs in the shape of a circular arc or segment of an circular arc, whereby the circular arc has a guide centre and a guide radius. In this context, "shape of a circular arc" means that the second guide region corresponds to or follows an circular arc segment of a circular arc in its extension. The guide radius corresponds in particular to the radius or the diameter of the circular arc or the circular arc segment of the second guide region. The centre point of the guide is the centre point of the circle to which the second guide region corresponds in its extension at least segment-wise. In this way, a particularly simple manufacturing can be achieved. Advantageously, the second guide region is therefore formed as an elongated hole in the shape of an circular arc or as an elongated hole in the shape of a segment of an circular arc, the circular arc having a guide centre which can advantageously be formed to coincide with the centre of the outer contour and/or the second centre. In this way, a particularly simple production can be achieved.

Particularly preferably, the system has a reference system for detecting a relative position of the pin-like element within the guide opening. In this way, it is advantageously possible for the user to be informed of the position of the second opening relative to the first guide region or relative to the first guide region. This is particularly advantageous because the first guide region is not visible to the user if the eccentric elements are chosen to be correspondingly large. By means of the reference system, for example in the form of a scale, it is accordingly possible to detect a relative position. In addition, it is possible to record or document any changes in the long term. In addition, it is possible to coordinate the respective positions with those of other axle bearings in order to ensure an optimal adjustment or axle adjustment quickly as possible, especially on the same vehicle.

Preferably, the eccentric element has the second guide region. Due to the arrangement of the second guide region on the eccentric element, the second guide region is visible to the user. In contrast, in an embodiment in which the pin-like element is pronounced on the eccentric element and engages in a corresponding opening in the frame element, it would not be visible. However, in the case of a corresponding embodiment of a non-visible second guide region, this would also be protected against dirt and other environmental influences.

Advantageously, the eccentric element can be displaced manually and/or motor-driven. For example, the eccentric element has a handling aid in the form of a recess, whereby a crank element can be inserted in this recess, if required, in order to cause the corresponding displacement, i.e. the rotation of the eccentric element. However, it is also conceivable that the eccentric element can be moved by means of a motor-driven mechanism. Here, for example, by means of a position of the motor which rotates the eccentric element, conclusions can be drawn about the current position of the eccentric element, in particular with regard to the position of the opening in relation to the first guide region. For example, a toothing is provided on the outermost circumference of the eccentric element in order to accommodate a driving movement or rotational movement. However, since a displacement of the axle, in particular for tracking an axle system, occurs comparatively rarely, it is advantageous, as a rule, to dispense with a corresponding motorisation, with the associated weight, and instead to displace the eccentric element by means of a manual actuation.

Preferably, the first guide region and/or the opening in the eccentric element has a first radius and an outer contour of the eccentric element has a second radius, wherein a first centre of the first guide region and/or the opening is spaced by an eccentricity from the centre of the outer contour, wherein a ratio of (R2-R1-E) to R2 is in the range between 0.2 and 0.8, preferably between 0.4 and 0.6, and particularly preferably between 0.45 and 0.55.

Alternatively or additionally preferably, the first guide region in the eccentric element has a first radius (R1), wherein the second circular arc-shaped and/or circular arc segment-shaped guide region has a guide radius (R3), wherein a first centre of the first guide region is spaced from the guide centre by a guide eccentricity (FE), wherein a ratio of (R3-R1-FE) to R3 is in the range between 0.2 and 0.8, preferably between 0.4 and 0.6, and particularly preferably between 0.45 and 0.55. At a ratio of 0.2 to 0.8, a particularly simple production of the eccentric element can be achieved. At a ratio of 0.4 to 0.6, the applicant has surprisingly found that a particularly good adjustability or intuitive operation can be achieved. With a ratio of 0.45 to 0.55, a particularly good compromise between adjustability and space requirements can be achieved.

Advantageously, the eccentricity and the guide eccentricity are of the same size and/or the guide centre and the second centre of the outer contour are congruent. In this way, a particularly simple manufacturing can be achieved.

The opening is advantageously a circular aperture. This also enables a particularly simple manufacturing process to be achieved, as well as a particularly secure and defined accommodation of a fastening or clamping means, in particular for a transverse link.

Preferably, the steering element has an engagement region which can be brought into engagement in a form-fitting manner, at least in regions, with the first guide region of the eccentric element or a fastening means. The fastening means is preferably a screw or a bolt which passes through the frame element, the steering element and the eccentric element to fix the alignment of the eccentric element or the steering element and clamps the frame element, the steering element and the eccentric element together by fixing them accordingly, for example by means of a nut. The steering element can be connected directly and/or indirectly to the eccentric element.

Preferably, the second guide region is coated at least in regions. In particular, the inside of the second guide opening is coated to minimise friction between the pin-like element and the second guide region in order to ensure the easiest possible displacement. Furthermore, it could be useful to harden the corresponding contact surface between the pin-like element and the second guide region, or to provide it with a corresponding coating that reduces wear during use of the eccentric element.

Particularly preferably, the pin-like element passes through the eccentric element in the mounted state and protrudes with respect to the eccentric element. This advantageously allows the eccentric element to be additionally fixed to the frame element via the pin-like element. For example, it is conceivable that the pin-like element has a thread at its penetrating end, via which a corresponding counterpart can be screwed on in order to fix the eccentric element to the frame element. This advantageously facilitates the fixing of the eccentric element. In particular, it is conceivable that the corresponding protruding part of the pin-like element is used for a pre-adjustment of the eccentric element and that the final fixing is only carried out after the pre-adjustment by means of the fastening means which reaches through the opening of the eccentric element.

A further aspect of the present invention is an eccentric element for an axle adjustment system, in particular of a commercial vehicle, comprising a frame element with a first guide region, in particular in the form of a first guide opening, for displacing a steering element, to which the axle is connected in the mounted state, in the adjustment direction, an alignable eccentric element with an opening, the arrangement of which in relation to the first guide region determines the displacement of the steering element, and a second guide region, in particular in the form of a second guide opening, via which the eccentric element and the frame element are in engagement with one another and in which, in the mounted state, a pin-like element engages, the pin-like element, when the eccentric element is aligned relative to or along the second guide region, in particular in the second guide opening, can be moved or displaced. All the features and advantages described for the system can be transferred analogously to the eccentric element and vice versa.

A further aspect of the present invention is a method of adjusting an axle by means of an axle adjustment system, in particular of a commercial vehicle, comprising a frame element with a first guide region, in particular in the form of a first guide opening, for displacing a steering element, to which the axle is connected in the mounted state, in the adjustment direction, an alignable eccentric element with an opening, the arrangement of which in relation to the first guide region determines the displacement of the steering element, and a second guide region, in particular in the form of a second guide opening, via which the eccentric element and the frame element are in engagement with one another and in which, in the mounted state, a pin-like element engages, wherein the pin-like element, when aligning the eccentric element relative to or along the second guide region, in particular in the second guide opening, can be displaced or moved. All the features and advantages described for the system can be applied analogously to the process and vice versa.

BRIEF DESCRIPTION OF THE DRAWINGS

Further advantages and features result from the following description of preferred embodiments of the axle adjustment according to the invention with reference to the attached figures. It is understood that individual features of the various embodiments shown may be combined with one another within the scope of the invention. It shows:

FIG. 1 is a view of a prior art axle adjustment system;

FIG. 2 is a sectional view of the prior art axle adjustment system shown in FIG. 1;

DETAILED DESCRIPTION OF THE PREFERRED EMBODIMENTS

Figure 3:
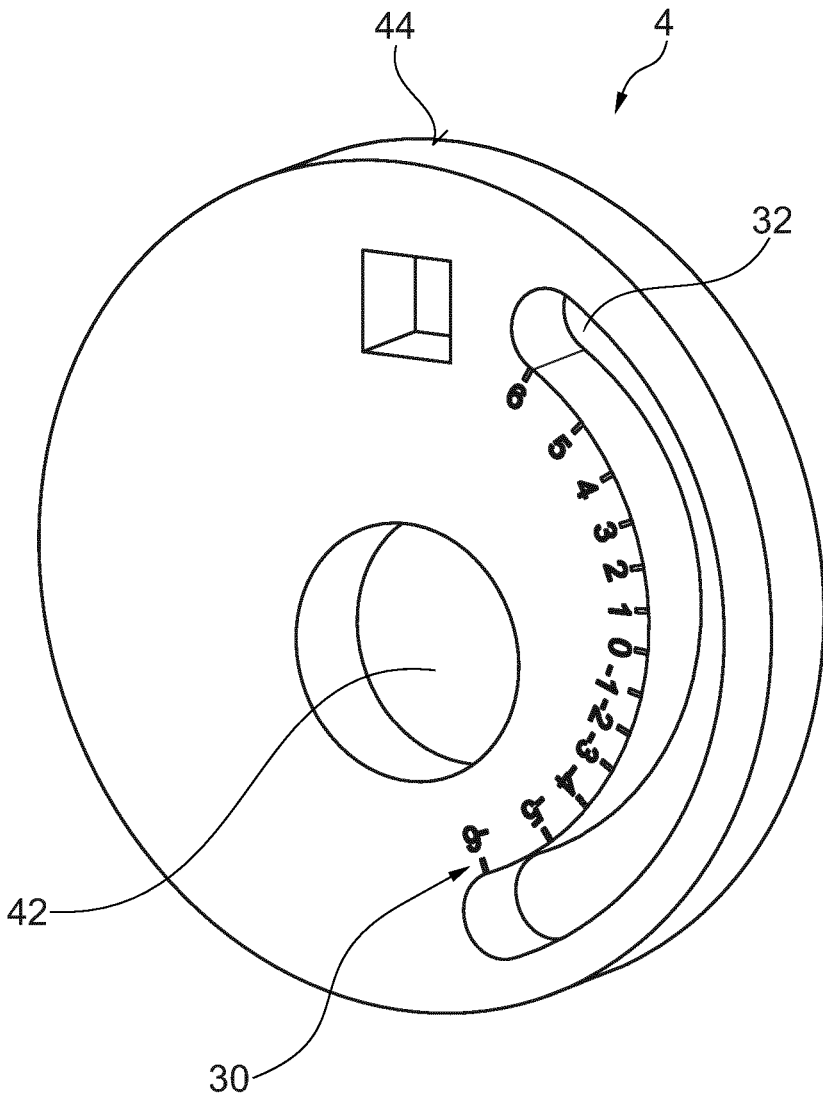
FIG. 3 is a first view of an eccentric element according to an exemplary embodiment of the present invention.

FIG. 1 shows a side view of a prior art axle adjustment system. The essential components are a frame element 2, an eccentric element 4 and a steering element 6, whereby the steering element 6 is connected to the frame element 2 via a fastening means 8, for example a bolt or a screw, and the eccentric element 4 is connected to the frame element 2. The eccentric element 4 has an outer contour 44 which is, for example, circular in shape, the circular outer contour 44 having a radius R2. Furthermore, the eccentric element 4 has an opening 42, which is preferably also circular and whose centre is spaced from the centre of the outer contour 44, i.e. the opening 42 is not arranged concentrically to the outer contour 44. Accordingly, the opening 42 is arranged eccentrically to the outer contour 44 of the eccentric element 4. The eccentric element 4 is supported against displacement in the adjustment direction L against two opposing second lug elements 10, which prevent displacement of the eccentric element 4 in the adjustment direction L by means of form-fitting interaction. If the eccentric element 4 is now rotated by an angle of rotation α, the opening 42 is displaced in the direction of adjustment L, since the eccentric element 4 is supported by the second lug elements 10 and is thus secured against displacement in the direction of adjustment L. Preferably, the steering element 6 engages or is connected directly or indirectly with the opening 42, whereby the steering element 6 also undergoes a displacement in the adjustment direction L when the opening 42 is displaced in the adjustment direction L. Furthermore, the steering element 6 is preferably secured by a first fastening means 8, which in particular produces a force fit and/or a form fit between the opening 42 and an engagement region 62 of the steering element 6 not shown in FIG. 1, and in this way fixes the steering element 6 to the opening 42. Furthermore— shown with a dashed line—a first guide region 22 of the frame element 2 is shown, which serves in particular to prevent the steering element 6 from moving transversely to the adjustment direction L. By determining the position of the opening 42 above the first guide region 22, an extent of the displacement of the steering element 6 in the adjustment direction L is determined. In this case, the first guide region 22 is particularly preferably designed as a first guide opening. Alternatively, it is conceivable that the first guide region 22 is a first guide rail.

A handling aid 45 is preferably provided on the front side of the eccentric element 4, which is designed, for example, as a projection or handle or as a recess for a hand crank, in particular a hand crank that can be inserted into a recess. The handling aid 45 makes it particularly easy for the user to turn the eccentric element 4 relative to the frame element 2 and thus determine the position of the opening 42 relative to the first guide opening.

FIG. 2 shows the sectional view of the preferred embodiment already indicated in FIG. 1. In particular, it can be clearly seen that the fastening means 8 reaches through the first guide region 22 of the frame element 2 as well as through the opening 42 of the eccentric element 4 and through the engagement region 62 of the steering element 6 and fixes these parts or units to each other, for example form fitting and/or force fitting. In this preferred embodiment, the engagement region 62 of the steering element 6 and also the opening 42 of the eccentric element 4 is designed as a recess or bore, whereby in particular a circular or cylindrical geometry is preferably provided, in which in turn a cylindrical body, such as for example a bolt or a screw, can engage. By means of the dashed lines, the position of the centre of the opening 42 relative to the position of the centre of the outer contour 44 is also shown. This position or offset in the adjustment direction L is indicated by the letter x. Furthermore, in this embodiment the lug element 10 is made in one piece with the frame element 2 as a projection, whereby in particular preferably two lug elements 10 are provided which lie opposite each other in the adjustment direction L and which secure the eccentric element 4 against displacement both in the positive and in the negative adjustment direction L. The fastening means 8 is preferably designed as a screw, whereby a nut is provided opposite the screw head, i.e. shown on the upper side in the figure, which creates a force-fitting connection between the elements or units penetrated by the screw. In particular, it is preferred that washers not shown in the figure are used in order to allow the steering element 6 to pivot relative to the frame element 2 even when a force-fitting connection exists, the washers sliding against each other during this process.

Figure 4:
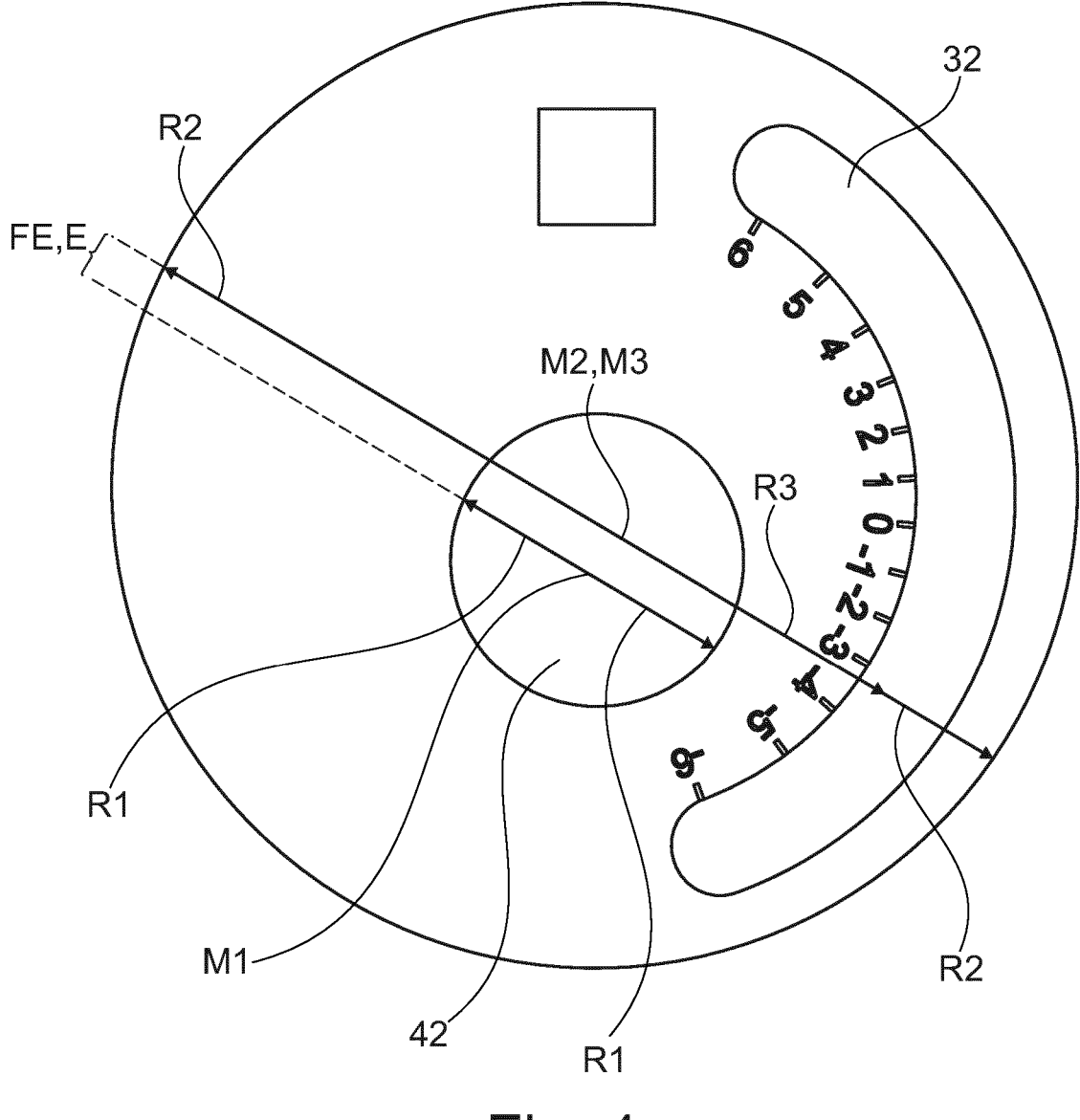
FIG. 4 is a second view of an eccentric element according to an exemplary embodiment of the present invention.

FIGS. 3 and 4 show an eccentric element 4 in a perspective view (FIG. 3) and in a top view (see FIG. 4) according to an exemplary embodiment of the present invention. In contrast to the eccentric element 4 of FIGS. 1 and 2, the eccentric element 4 of FIGS. 3 and 4 has a second guide region 32 next to the opening 42. In the example shown in FIGS. 3 and 4, the second guide region 32 is formed as an arcuate elongated hole which preferably extends over an angle range between 45° and 180°, particularly preferably between 60° and 150°. In particular, it is provided that the eccentric element 4 is disc-shaped and/or that the second guide region 32 is designed as a second guide opening, the general course of which preferably runs concentrically to the outer contour 44.

The second guide region 32 serves in particular for mounting the eccentric element 4 on the frame element 2. For this purpose, a pin-like element 31 engages in the second guide region 32, in particular in the form of a second guide opening. This makes it advantageously possible to dispense with the guide elements 10 which, in the prior art embodiments, serve to secure the eccentric element 4 against displacement in the positive and negative adjustment direction L. This object is now fulfilled by the second guide region. This object is now fulfilled by the second guide region 32 together with the pin-like element 31 which engages in the second guide region 32.

It is particularly preferred that the eccentric element 4 has a reference system 30, for example in the form of a scale, by means of which the user can determine in which position the eccentric element 4 is in the mounted state. This is particularly advantageous because, if the eccentric element 4 is appropriately dimensioned, the first guide region 22 is covered so that the user does not have a clear view of the first guide region 22. Accordingly, the reference system 30 serves as an orientation aid to determine the extent of the adjustment or the position in the first guide region 22. Furthermore, it is possible to document changes by means of the reference system 30.

Furthermore, it is evident from FIGS. 3 and 4 that the handling aid 45 is a recess or recess in the eccentric element 4, into which a corresponding crank element can be inserted if required, in order to simplify the alignment or displacement of the eccentric element 4 during operation.

In the top view of the eccentric element 4 shown in FIG. 4, the first radius R1 of the opening 42 and the second radius R2 of the outer contour 44 are drawn. The first radius and the second radius extend respectively from the first centre of the opening 42 and the second centre M2 of the eccentric element 4. In particular, it is intended that the first centre M1 is offset by an eccentricity E relative to the second centre M2. In particular, it has been shown to be advantageous if a ratio of (R2-R1-E) to R2 lies in a range between 0.2 and 0.8, and particularly preferably between 0.4 and 0.6. In the FIG. 4 shown, it should be noted that the diameters are drawn which are each formed from two radii. In particular, it is intended that the first centre M1 is offset by a guide eccentricity FE with respect to the guide centre M3, which can also be referred to as the guide centre. In FIG. 4, the second guide region 32 is formed as an elongated hole extending in the shape of an circular arc, the circular arc having a guide centre M3. The circular arc has a guide radius R3.

Figure 5:
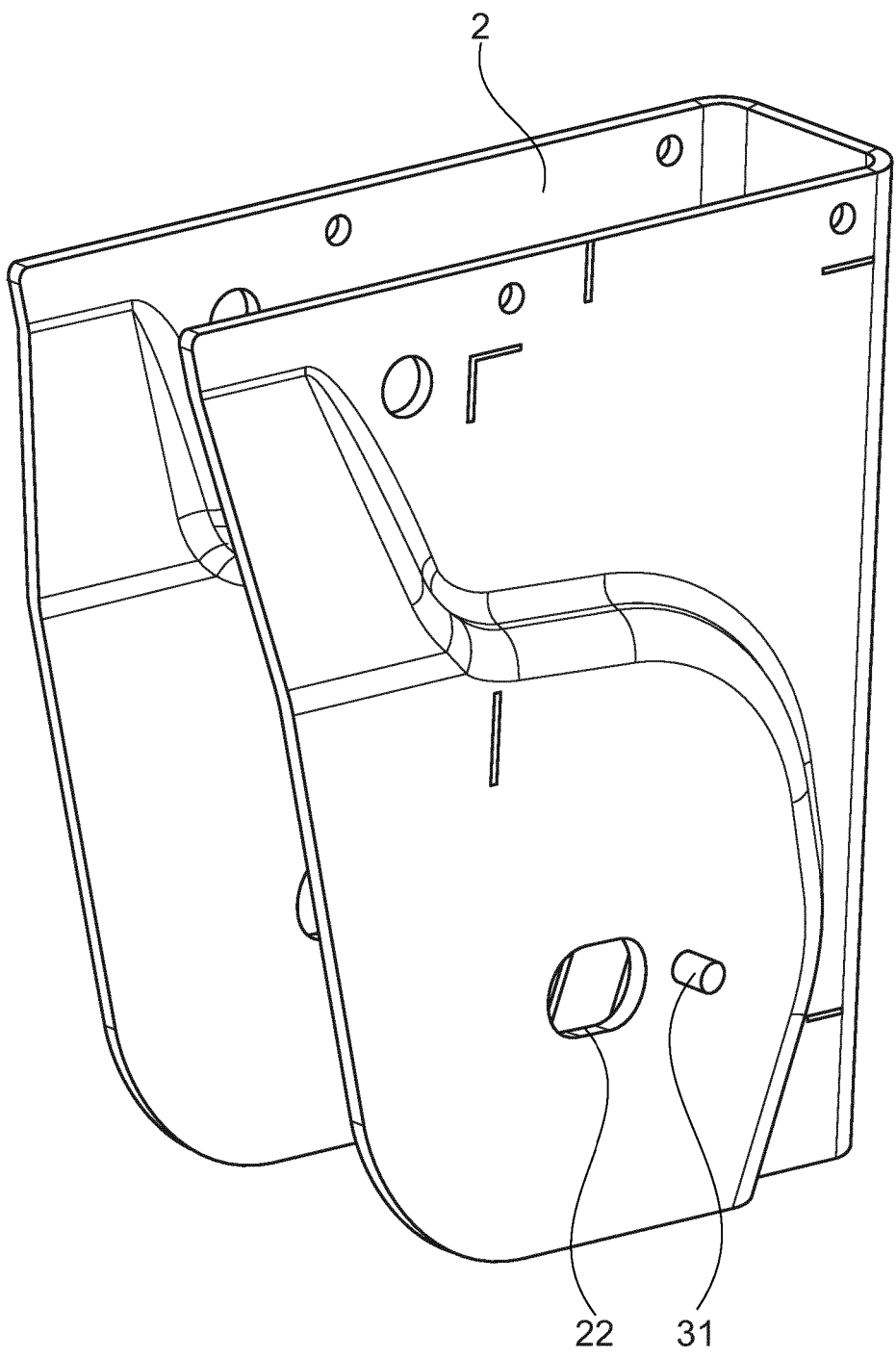
FIG. 5 is a frame element for an axle adjustment system according to a first exemplary embodiment of the present invention.

FIG. 5 shows a frame element 2 for a system 1 for axle adjustment according to a preferred embodiment of the present invention. In particular, the frame element 2 shown is a support bracket which is provided for supporting a steering element 6. The steering element 6, which is pivotably mounted on the support bracket, is preferably mounted about an axis, the position of which is determined by means of the axle adjustment system 1. The frame element 2 shown here comprises two side surfaces running essentially parallel to each other, each of which has openings 22 in order to mount the steering element 6 on the support bracket or frame element. It is preferably provided that only one of the side walls has a first guide region 22 in the form of an elongated hole, while the other side surface has a round opening that does not allow any displacement in the adjustment direction L, so that a displacement at the first guide region 22 clearly determines the alignment of the axle. In particular, an inclined position of the steering element 6 can be realised in this way with the system 1 for axle adjustment, or a corresponding inclined position can be compensated for. In particular, a pin-like element 31 is provided on the side surface, in particular the side surface with the first guide region 22 formed as an elongated hole, which is intended to pass through the second guide region 32 of the eccentric element 4 in the mounted state. Compared to the prior art embodiments of the system 1 for axle adjustment (see FIGS. 1 and 2), the link elements 10 can be advantageously dispensed with and instead the comparatively small-dimensioned pin-like element 31 serves as a substitute for the link elements 10. This also allows weight to be saved in an advantageous manner.

Figure 6:
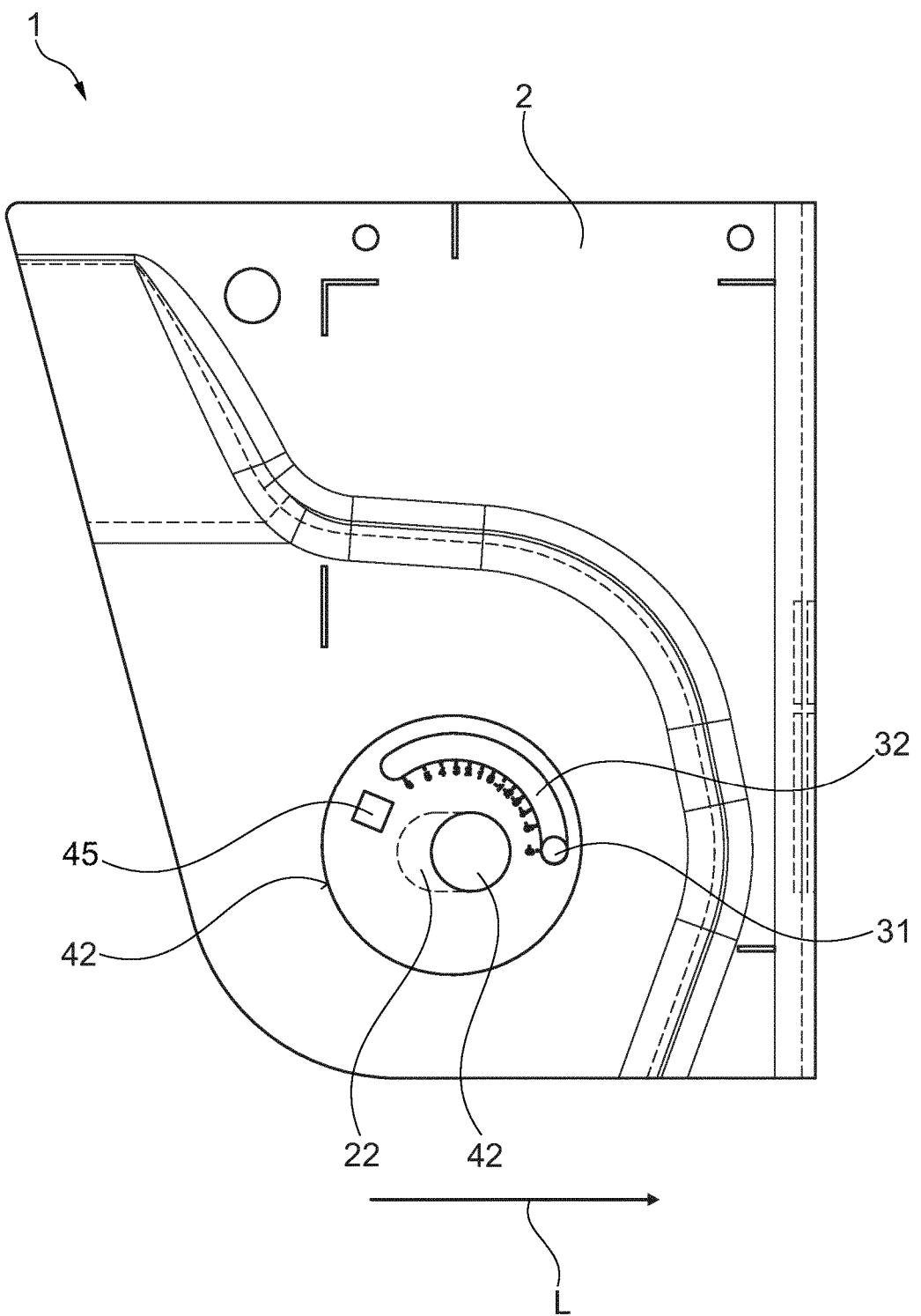
FIGS. 6-8 is the system with the eccentric element of FIGS. 3 and 4 and the frame element of FIG. 5 in the mounted state in three different orientations of the eccentric element.
Figure 7:
Figure 8:
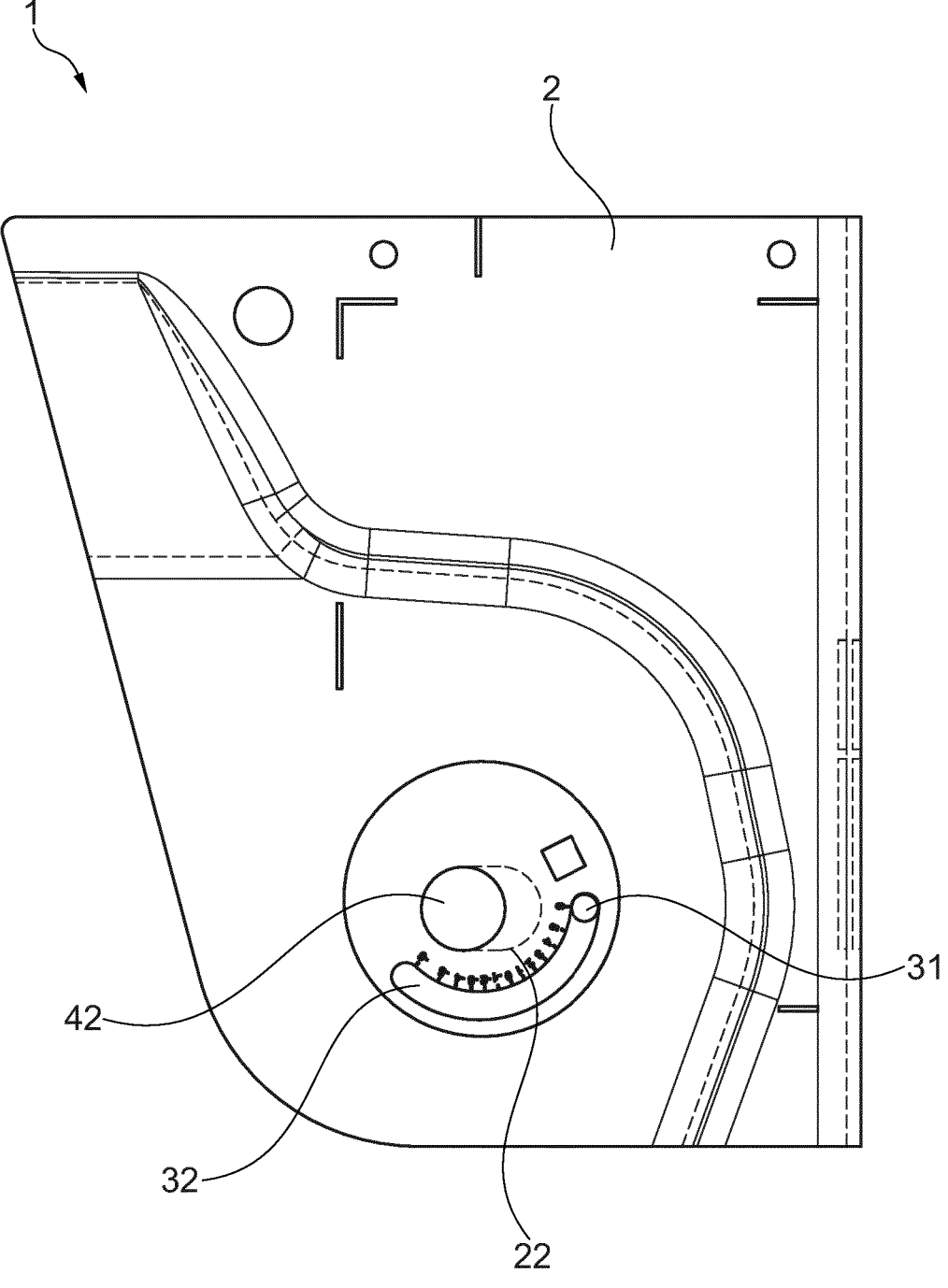

FIGS. 6 to 8 show the system 1 for axis adjustment with an eccentric element 4 from FIGS. 3 and 4 and a frame element 2 from FIG. 5 in the mounted state. FIGS. 6 to 8 show the respective orientations of the eccentric element 4. In particular, FIG. 7 shows a central position in which the eccentric element 4 is aligned or oriented in such a way that the opening 42 of the eccentric element 4, viewed in the adjustment direction L, is arranged in a centre of the first guide region 22. In contrast, in FIG. 6, the eccentric element 4 is arranged such that the opening 42 abuts a first end of the first guide region 22, while in FIG. 8, the eccentric element 4 is oriented such that the first opening 42 is arranged above a second end of the first guide region 22. Correspondingly, the second guide region 32, i.e. the elongated hole in the shape of a circular arc, is aligned with the orientation of the opening 42 above the first guide region 22, in particular in such a way that in the position of FIG. 6 and FIG. 8 the pin-like element 31 comes into abutment with the ends of the elongated hole of the second guide region 32.

Furthermore, it is preferably provided that the pin-like element 31 not only reaches through the second guide region 32, but also protrudes with respect to the eccentric element 4. This advantageously allows the eccentric element 4 to be additionally fixed to the frame element 2 via the pin-like element 31, for example by means of a corresponding nut. In particular, the eccentric element 4 is clamped to the frame element 2 via the pin-like element 31.

Figure 9:
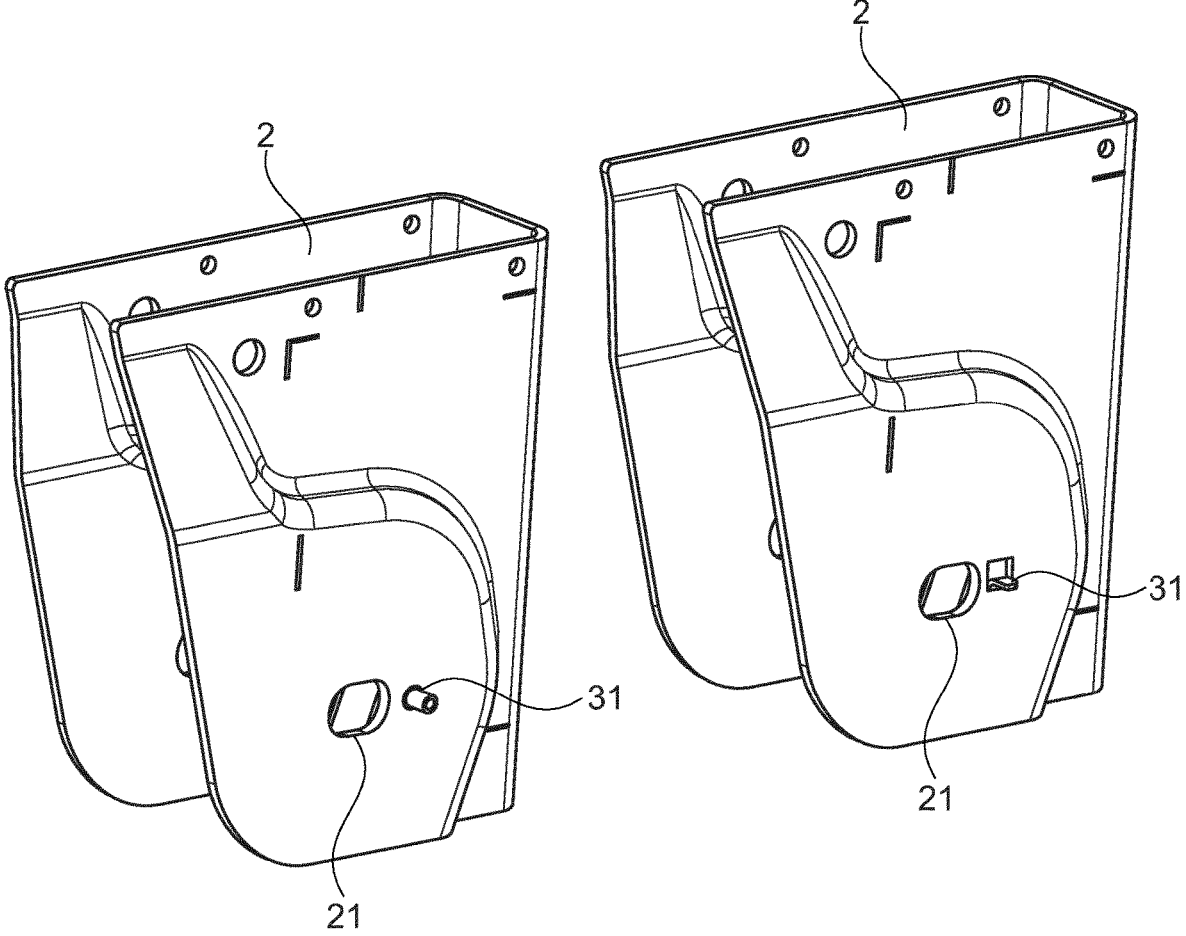
FIG. 9 is a frame element for an axle adjustment system according to a second and third exemplary embodiment of the present invention.

FIG. 9 shows two frame elements 2 according to a second and third embodiment of the present invention. They are characterised by the fact that the pin-like element 31 is formed by reshaping a side wall of the frame element. For example, in the left-hand embodiment a sleeve-shaped or cylindrical projection is punched or stamped out and in the right-hand side a tab is formed by a bending process in such a way that the tab runs obliquely to the outer wall or side wall of the frame element 2. This makes it particularly easy to form the pin-like element 31 on the frame element 2.

REFERENCE LIST

1 system
2 frame element
4 eccentric element
6 steering element
8 fastening means
10 lug element
22 first guide section
30 reference system
31 pin-like element
32 second guide region
42 opening
44 outer contour
45 handling aid
62 engagement region
E eccentricity
FE guide eccentricity
R1 first radius
R2 second radius
R3 guide radius
α angle of twist
L adjustment direction
M1 first centre
M2 second centre
M3 guide centre

The invention claimed is:

1. A commercial vehicle trailer, comprising:
an axle adjustment system of the commercial vehicle trailer that comprises:
    a frame element that includes a first guide region that includes a first guide opening, where the first guide region is configured to be attached to an axle of the commercial vehicle trailer in a mounted state and to displace a steering element in an adjustment direction, and an alignable eccentric element that includes an opening, where the arrangement of the alignable eccentric element in relation to the first guide region determines the displacement of the steering element; and
    a second guide region that includes a second guide opening via which the eccentric element and the frame element engage with one another and in which a threadless pin-like element engages in the mounted state;
    wherein the pin-like element is configured to be displaced relative to the second guide region in the second guide opening, when the eccentric element is aligned;
    wherein the frame element includes a support bracket;
    wherein the opening of the eccentric element includes a circular aperture; and
    wherein a first centre of the opening of the eccentric element is offset by a guide eccentricity with respect to a guide centre of the second guide region.

2. The commercial vehicle trailer according to claim 1, wherein the second guide region extends in a circular arc shape.

3. The commercial vehicle trailer according to claim 2, wherein the circular arc shape has a guide centre.

4. The commercial vehicle trailer according to claim 1, wherein the axle adjustment system further comprises a reference system for detecting a relative position of the pin-like element within the second guide region.

5. The commercial vehicle trailer according to claim 1, wherein the eccentric element comprises the second guide region.

6. The commercial vehicle trailer according to claim 1, wherein the eccentric element is manually and/or motor-driven displaceable.

7. The commercial vehicle trailer according to claim 1, wherein the first guide region and/or the opening of the eccentric element has a first radius and an outer contour of the eccentric element has a second radius, wherein a first centre of the first guide region and/or of the opening of the eccentric element is spaced by an eccentricity from a second centre of the outer contour, wherein a ratio of the second radius minus the first radius minus the eccentricity to the second radius is in the range of between 0.2 and 0.8.

8. The commercial vehicle trailer according to claim 7, where the ratio is within a range of between 0.4 and 0.6.

9. The commercial vehicle trailer according to claim 8, where the ratio is about 0.45.

10. The commercial vehicle trailer according to claim 7, wherein the first guide region in the eccentric element has a first radius, wherein the second guide region extends in a circular arc shape and has a guide radius, and wherein a first centre of the first guide region is spaced from a guide centre of the circular arc shape by a guide eccentricity, wherein a ratio of the guide radius of the circular arc shape of the second region minus the first radius minus the guide eccentricity to the guide radius of the circular arc shape of the second region lies in the range between 0.2 and 0.8.

11. The commercial vehicle trailer according to claim 10, wherein the eccentricity and the guide eccentricity are of equal size and/or wherein the guide centre and the second centre of the outer con-tour are congruent.

12. The commercial vehicle trailer according to claim 1, wherein the first guide region in the eccentric element has a first radius, wherein the second guide region extends in a circular arc shape and has a guide radius, and wherein a first centre of the first guide region is spaced from a guide centre of the circular arc shape by a guide eccentricity, wherein a ratio of the guide radius of the circular arc shape of the second region minus the first radius minus the guide eccentricity to the guide radius of the circular shape of the second region lies in the range between 0.2 and 0.8.

13. The commercial vehicle trailer according to claim 12, wherein the ratio is between 0.4 and 0.6.

14. The commercial vehicle trailer according to claim 13, wherein the ratio is between 0.45 and 0.55.

15. The commercial vehicle trailer according to claim 1, wherein the steering element has an engagement region which can be brought into engagement, at least in regions, in a form fitting manner with the first guide region in the eccentric element or a fastener.

16. The commercial vehicle trailer according to claim 1, wherein the second guide region is coated at least in regions.

17. The commercial vehicle trailer according to claim 1, wherein the pin-like element in the mounted state reaches through the eccentric element and protrudes with respect to the eccentric element.

* * * * *